(12) United States Patent
Hori et al.

(10) Patent No.: US 7,253,931 B2
(45) Date of Patent: Aug. 7, 2007

(54) FORM FIXING STRUCTURE AND IMAGE RECOGNITION APPARATUS HAVING THE STRUCTURE

(75) Inventors: Tetsuya Hori, Nissin (JP); Shuuichi Yamano, Nagoya (JP); Hisao Ogata, Nagoya (JP)

(73) Assignee: Hitachi, Ltd., Tokyo (JP)

( * ) Notice: Subject to any disclaimer, the term of this patent is extended or adjusted under 35 U.S.C. 154(b) by 1018 days.

(21) Appl. No.: 10/345,345

(22) Filed: Jan. 16, 2003

(65) Prior Publication Data

US 2003/0142369 A1    Jul. 31, 2003

(30) Foreign Application Priority Data

Jan. 30, 2002    (JP) .............................. 2002-020882

(51) Int. Cl.
    *H04N 1/04*    (2006.01)
(52) U.S. Cl. ...................... 358/474; 358/471; 358/199; 358/408; 382/317; 250/234; 359/197
(58) Field of Classification Search ................ 382/317, 382/181; 430/293; 412/1, 6, 33; 348/373; 358/474, 471, 199, 408; 355/21, 70; 250/234; 359/197
See application file for complete search history.

(56) References Cited

U.S. PATENT DOCUMENTS 4,258,125 A * 3/1981 Edhlund ..................... 430/293

6,115,513 A * 9/2000 Miyazaki et al. ........... 382/317
6,317,155 B1 * 11/2001 Ohyama ..................... 348/373

FOREIGN PATENT DOCUMENTS

| JP | 54-67424 | 5/1979 |
| JP | 62-18533 | 1/1987 |
| JP | 4-194919 | 7/1992 |
| JP | 7-117389 | 5/1995 |
| JP | 2000-115510 | 4/2000 |

OTHER PUBLICATIONS

"Contactless Color Scanner Blinkscan BS20" http://www.hitachi.co.jp/blinkscan Hitachi, Ltd. Information Systems Sales Dept. brochure, first distributed at Comdex (Las Vegas) Nov. 2000.
"Workflow System for Forms Processing; Forms Image Flow" Hitachi, Ltd. Information Systems Sales Dept. brochure, first distributed at Comdex (Las Vegas) Nov. 2000.

* cited by examiner

*Primary Examiner*—Aung S. Moe
*Assistant Examiner*—Heather D Gibbs
(74) *Attorney, Agent, or Firm*—McDermott Will & Emery LLP

(57) ABSTRACT

A structure holds a medium itself to be scanned flat on an installation base in a stand type image input device. The installation base of the image recognition apparatus is provided with a mechanism which clips a medium and straightens creases and curls in the medium. the installation base may be provided with adhesion. Alternatively a mechanism for holding down a medium with filaments finer than the resolution of the image input device maybe provided.

6 Claims, 10 Drawing Sheets

FIG.6H D-D : 4 parts

FIG.6E A-A : 4 parts

FIG.6F B-B : 2 parts

FIG.10I E-E : 4 parts

FIG.10E A-A : 4 parts

FIG.10F B-B : 2 parts

FIG.10H D-D : 2 parts

FORM FIXING STRUCTURE AND IMAGE RECOGNITION APPARATUS HAVING THE STRUCTURE

BACKGROUND OF THE INVENTION

This invention relates to a stand type image input device wherein an imaging portion is in non-contact with subjects.

In a stand type image input device, a medium to be scanned in is placed on an installation base and the image of the medium is captured. The optical lens thereof is not in contact with the medium and the space between the medium and the image portion is open; in other words, the medium is not fixed. Distortion or defocusing may occur during image input with this structure because of creasing or curling in the medium. The distortion or defocusing causes the recognition rate to be degraded when the characters in the inputted image are recognized.

One method for preventing erroneous recognition is that an image is scanned in under two different conditions, and the scanned-in images are synthesized and developed on a plane. Such a technique is disclosed, for example, under Japanese Patent Laid-open No. 2000-115510.

However, the above technique requires two or more times of image scanning for one time of recognition, and poses a problem of increase in scanning-in time. Further, the capacity of memory is increased for synthesizing, and this leads to another problem, increase in cost.

SUMMARY OF THE INVENTION

In an image recognition device, even if a medium, such as paper and film, to be scanned in is creased or curled, the medium is held flat on the installation base of a stand type image input device. With this structure, favorable images free from distortion and defocusing are captured, and degradation in the character recognition rate due to creasing, curling, or the like in media is prevented.

In another aspect, an image processing device includes a form fixing structure for clipping a medium to be scanned in and thereby holding the medium on the installation base of an image recognition apparatus. This structure allows media to be held flat on the installation base.

In still another aspect, an image processing device is provided with a form fixing structure which gives adhesion to the installation base of an image recognition apparatus or holding down a medium with filaments finer than the resolution of an image input device.

Additional objects, advantages and novel features of the examples will be set forth in part in the description which follows, and in part will become apparent to those skilled in the art upon examination of the following and the accompanying drawings or my be learned by production or operation of the examples. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way or example only, not by way of limitations. In the figures, like reference numerals refer to the same or similar elements.

DETAILED DESCRIPTION OF PREFERRED EMBODIMENT

Figure 1:
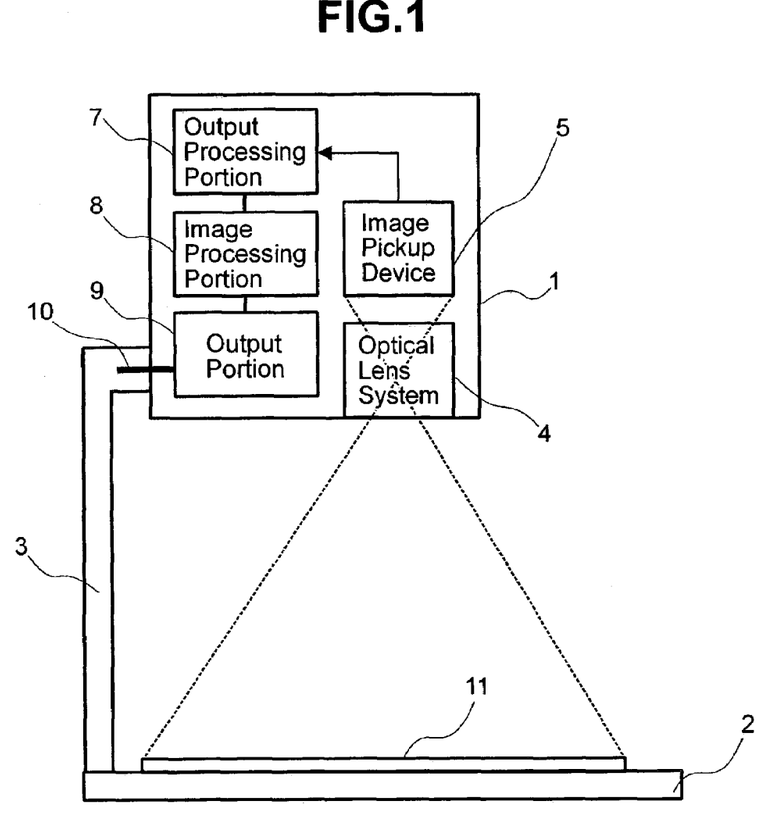
FIG. 1 is a schematic diagram illustrating an example of the image input device in one embodiment.

Examples will be described below:

FIG. 1 is a schematic diagram of the image input device of an exemplary embodiment. The image processing device mainly includes an imaging portion 1, an installation base 2, a strut 3, and a medium fixing structure 11. In this embodiment, the medium fixing structure 11 is removable from the installation base 2. Therefore, the imaging portion 1, the installation base 2, and the strut 3 can be used as an independent image input device.

The imaging portion 1 is an input unit that digitizes the image of a medium scanned in and inputs the data as image data. A CCD camera is used in this embodiment. Media to which the input device is applicable include forms, such as deposit slips and other slips used at reception desks in financial institutions, municipal offices, and the like and certificates, such as driver's licenses.

The imaging portion 1 mainly includes an optical system 4, an image pickup device 5, an output processing portion 7, an image processing portion 8, an output portion 9, and an external interface (I/F) 10. The optical system 4 comprises one or more lens or the like for gathering light reflected from a medium. The image pickup device 5 is an imaging sensor such as CCD or CMOS, which spatially samples the formed image of a subject and converts the formed image of the subject photo-electrically. The output processing portion 7 processes received analog image data by amplification, correlation double sampling, A-to-D conversion, and the like and outputs the obtained digital data. The image processing portion 8 processes received image data by shading correction, γ correction, MTF correction, and the like as required. An output portion 9 outputs image data by control based on a protocol for the external I/F 10.

The installation base 2 is a support base on which the medium fixing structure 11 is installed. Alternatively, in case image input is done without use of the medium fixing structure 11, the installation base 2 is used as a platform on which a medium to be inputted is set. The installation base 2 is also used as a base for supporting the imaging portion 1. The imaging portion 1 is held above the installation base 2 with the strut 3. In case the medium fixing structure 11 is not set on the installation base 2, a medium, or the subject of image input, is placed on the installation base 2, and the image of the medium is formed on the image pickup device 5 through the optical system (lens) 4.

The surface of the installation base 2 is coated in matte black. This coating reduces reflection from other sources than the medium in case image input is done without use of the medium fixing structure 11. Black coating is most suitable but any other coating method may be used provided it is less reflective. The strut 3 is a column that supports the imaging portion 1. In the strut 3, the external I/F 10 runs, which sends out acquired image data, for example to a host computer or the like.

The illustrated example relates to a non-contact type image input device or a stand type image input device wherein a medium to be scanned in is set at a distance from an imaging portion 1. In this embodiment, an explanation is given about an example of an image input device that is not provided with lamps for projecting light to a medium and uses ambient lighting in the external environment. However, the invention is also applicable to an image input (not shown) device wherein image input is done in lighting from lamps.

Figure 2A:
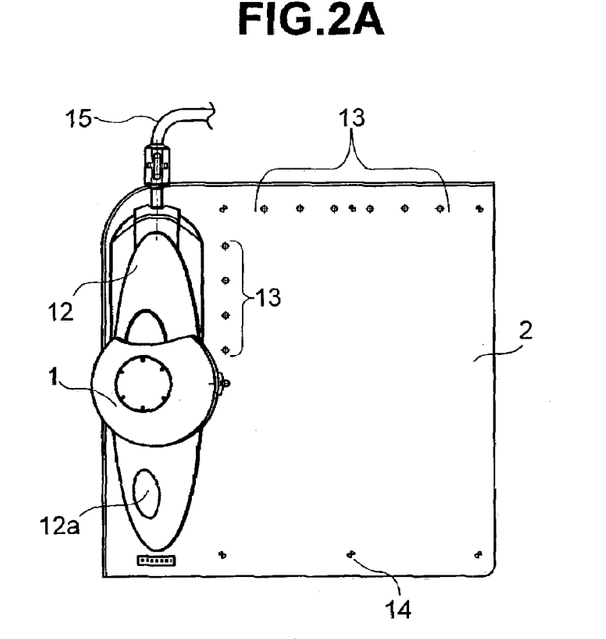
FIGS. 2(a) and 2(b) are schematic top views of the installation base in one embodiment.
Figure 2B:
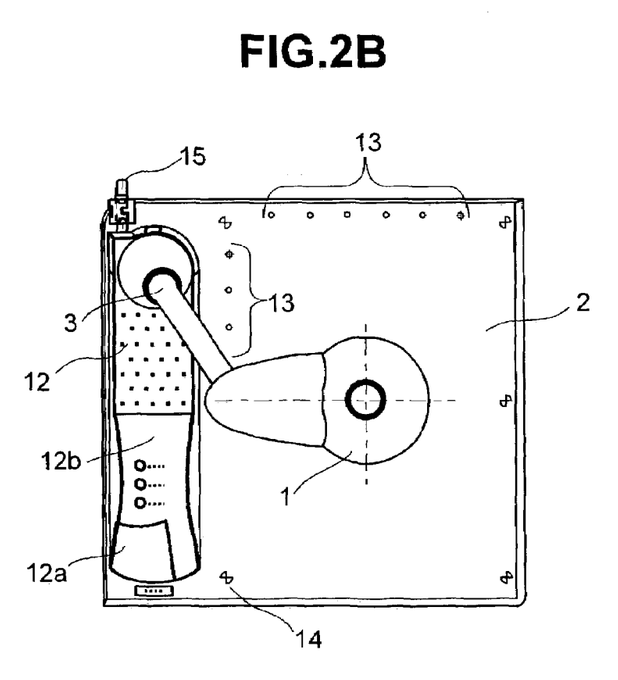

FIGS. 2(a) and 2(b) are overhead views of the image input device without the medium fixing-structure 11. FIG. 2(a) is an example in which the imaging portion 1 is installed so that the imaging portion is positioned above an end of the installation base 2. FIG. 2(b) is an example in which the strut 3 is inclined toward the substantially central portion of the installation base 2 and the imaging portion 1 is installed so that the imaging portion is positioned above the substantially central portion of the installation base 2.

In FIG. 2(a), the installation base 2 includes a control box 12, positioning pins 13, and scanning-in registration marks 14. The control box 12 has a control portion inside. The control portion controls image scanning-in by the imaging portion 1. When a switch 12a located on the control portion is pressed down, the control portion causes the imaging portion 1 to start scanning in an image. In this embodiment, the processing portions 7 and 8 and the output portion 9 are built in the imaging portion 1. These items may be built in the control box 12, together with the control portion. An I/F 10 from the imaging portion 1 is exposed at the control box 12, and image data is sent out to information processing equipment to be connected with the image input device.

The positioning pins 13 are a positioning mechanism that is used to determine the position in which a medium is to be set when image input is done without the medium fixing structure 11. In this embodiment, the positioning pins 13, or protrusions protruded from the installation base 2, are used as positioning mechanism. The positioning pins 13 are installed on two adjoining sides of the installation base 2 so that one corner of a medium can be abutted against the pins.

The scanning-in registration marks 14 are painted in white on the four corners and at the center of each of the four sides of the installation base 2 surface. These are used when image input is done by the imaging portion 1. Light reflected from the scanning-in registration marks 14 is measured to determine the illumination on the installation base 2, and this information is used to adjust image input conditions by the control portion.

In FIG. 2(b), the same numbers are assigned to parts similar to the parts in FIG. 2(a). The control box 12 in FIG. 2(b) is further provided with an indicator 12b for indicating the status of control. The example in FIG. 2(b) is different from the example in FIG. 2(a) in that a dedicated interface is adopted as the I/F. For this interface, a USB interface or the like may be adopted.

Figure 3A:
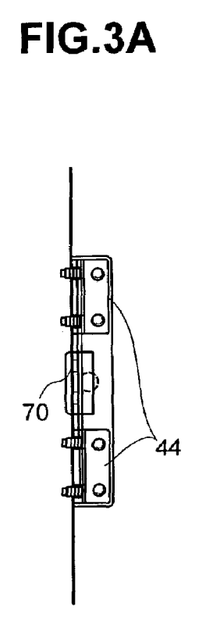
FIGS. 3(a) and 3(b) show an example of general views of the medium fixing structure.
Figure 3B:
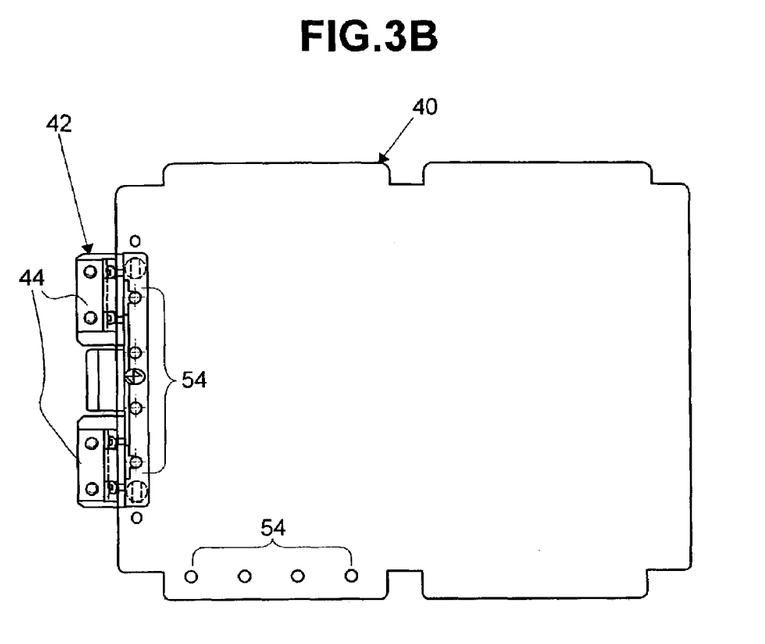

The image input device of the embodiment is provided with the medium fixing structure 11 for holding a medium as subject flat. FIGS. 3(a) and 3(b) illustrate one example of the medium fixing structure 11 in this embodiment. "Fixing" could be defined as correcting the document for creases or folds or the like, for example by substantially flattening or straightening out the document. The medium fixing structure 11 in this embodiment uses magnetic force to hold a medium. FIG. 3(a) is a top view of an opened clip. FIG. 3(b) is a side view of the closed clip viewed on the side thereof.

The medium fixing structure 11 in FIGS. 3(a) and 3(b) mainly includes a bed portion 40 and a clipping mechanism 42. The bed portion 40 is a plate on which a medium is to be placed. The clip 42 is an example of a clipping mechanism. The clipping mechanism 42 clips a medium placed on the plate and thereby holds the medium on the plate. As detailed later, a clip for opening and closing with hinges 44, or a clip with springs, and the like may be used as the clipping mechanism 42. In this embodiment, the clip 42 is screwed on the bed portion 40 at hinges 44.

The medium fixing structure 11 is set on the image input device so that one side thereof on the side of the clipping mechanism 42 is positioned at the upper part of the installation base 2 in FIG. 2(a). Provision of the medium fixing structure 11 as mentioned above enables image input with less influences of creases in a subject medium and enhances the recognition rate of information processing equipment.

Figure 4:
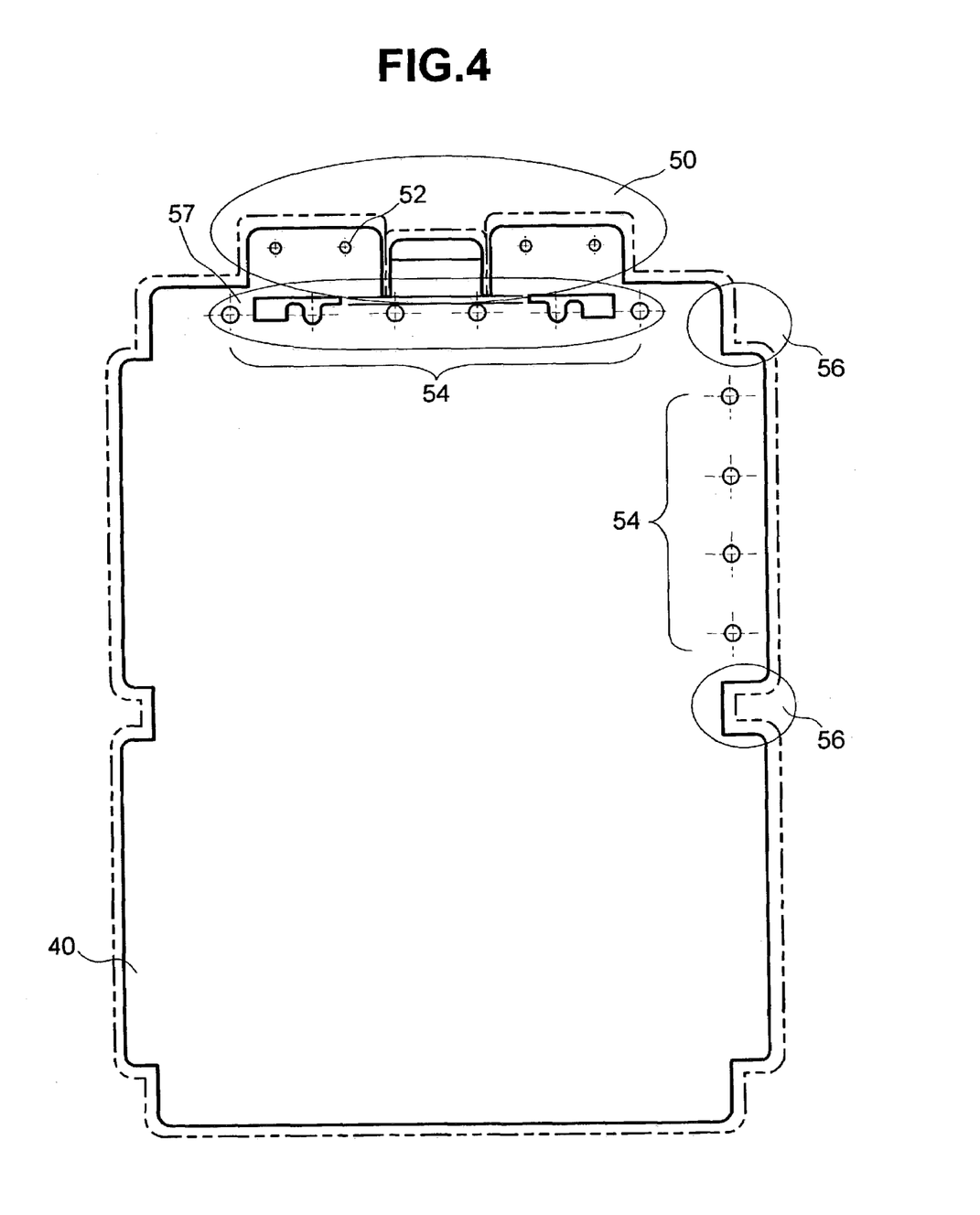
FIG. 4 is a drawing depicting an example of a bed portion.

FIG. 4 illustrates the bed portion 40 dismantled from the medium fixing structure 11 in FIG. 3(a). In FIG. 4, the bed portion 40 has a clipping mechanism mounting portion 50 and is further provided with screw holes 52 and fitting holes 54. The bed portion 40 is coated in matte black to reduce light reflected from other sources than the medium.

The clipping mechanism mounting portion 50 is a part at which the clipping mechanism 42 is screwed on the bed portion 40. The structure to fix the medium has the clipping mechanism mounting portion 50, the clipping area 57 and the clipping mechanism 42. The clipping mechanism mounting portion 50, the clipping area 57, and the clipping mechanism 42 sandwich and hold a medium between them. In another example, the structure may have the clipping mechanism independently clip a medium. The screw holes 52 are tapped for screws used to secure the clipping mechanism 42 on the bed portion 40 with hinges 44. Screws are inserted into one side of the hinges, of which other side 44 is screwed on the clipping mechanism 42, and tightened at the screw holes 52. Thus the clipping mechanism 42 is secured on the bed portion 40 with the hinges 44. Joining the clipping mechanism 42 with the installation base 2 by hinges 44 allows stable clipping operation.

The fitting holes 54 are used to receive the positioning pins 13 on the installation base 2 when the medium fixing structure 11 is installed on the installation base 2. Fitting the positioning pins 13 into the fitting holes 54 positions the medium fixing structure 11 in place on the installation base 2. The area in proximity to the fitting holes 54, especially the lower area is a clipping area 57 which clips a medium together with the clipping mechanism 42.

A cut 56 is made at the four corners and the side edges of the bed portion 40. The cuts 56 are intended to make the scanning-in registration marks 14 on the installation base 2 visible to the imaging portion 1 after the medium fixing structure 11 is installed on the installation base 2. These cuts 56 make the medium fixing structure easy to lift and facilitate the installation and removal of the medium fixing structure 11 on and from the installation base 2.

Figure 5A:
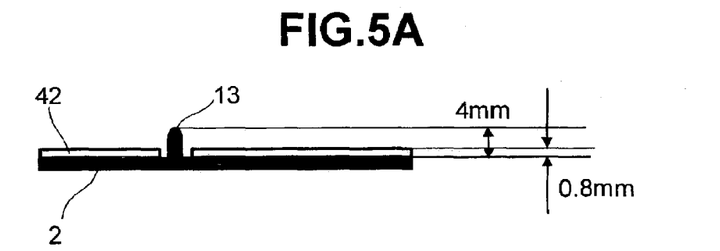
FIGS. 5(a) and 5(b) show cross-sectional views of the installation base and a medium fixing structure.

FIG. 5(a) illustrates a section of the area in proximity to a positioning pin 13 with the medium fixing structure 11 installed on the installation base 2. In this embodiment, the height of the positioning pin 13 is increased so that the positioning pins 13 penetrate the fitting holes 42 in the bed portion 40 and protruded through the upper face of the bed portion 40. That is, the positioning pins 13 are so designed that the height of the positioning pins is greater than the height of the bed portion 40.

In the constitution in FIG. 5(a), the height of the positioning pins 13 is set to 4.0 mm and the height of the bed portion 40 is set to 0.8 mm so that the positioning pins are protruded through the surface of the bed portion 40 by 3.2 mm. Protruding the positioning pins 13 from the bed portion 40 as mentioned above makes it possible to determine the setting position of a medium on the medium fixing structure 11. Further, using the positioning pins 13 on the installation base 2 and the fitting holes 54 to determine the setting position of the medium fixing structure 11 and the setting position of a medium on the medium fixing structure 11 makes it possible to position a medium on the medium fixing structure by one mechanism.

In this embodiment, the focus of the optical system in the imaging portion 1 is fixed and the system is not provided with an automatic focusing mechanism. It is preferable that the positioning pins 13 should be used to position a medium in place on the bed portion 40 through the fitting hole 13 as in the constitution in FIG. 5(a). Further, it is especially preferable that the positioning pins 13 should be substantially perpendicularly erected and the cross-sectional areas of the pins should be consistent from the level of its bottom on the installation base 2 to the level of the top of the bed portion 40. This is because: with this structure, the position of a medium set by abutting against the positioning pins 13 on the installation base 2 is matched with the position of the medium set on the medium fixing structure 11. As a result, exact image data is obtained even with an image input device whose field of view (scope of imaging) is fixed like the image input device in this embodiment.

Figure 5B:
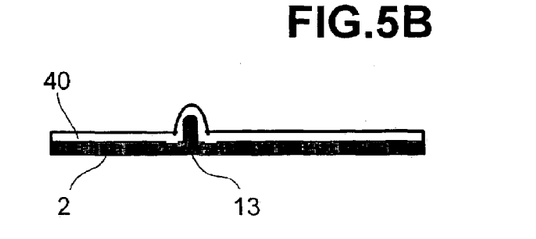

In this embodiment, the fitting holes 54 to be engaged with the positioning pins 13 are provided. Alternatively, a covering portion covering the positioning pins 13, as shown in the FIG. 5(b), may be adopted. In this case, a medium is abutted against the projected covering portion, which thus functions to position the medium in place on the bed portion 40. In this case, however, the position in which a medium is abutted against the positioning pins on the installation base 2 differs from the position in which a medium is abutted against the covering portion. To cope with this, the thickness of the covering portion should be preferably reduced as much as possible to reduce the deviation.

The various views of FIG. 6 illustrate the clipping mechanism 42. FIG. 6(a) is a side view of the clipping mechanism 42. FIG. 6(b) illustrates the clipping mechanism viewed from the direction of "b." FIG. 6(c) illustrates the clipping mechanism viewed from the direction of "c." FIG. 6(d) illustrates the clipping mechanism 42 viewed from the direction of "d."

Figure 6A:
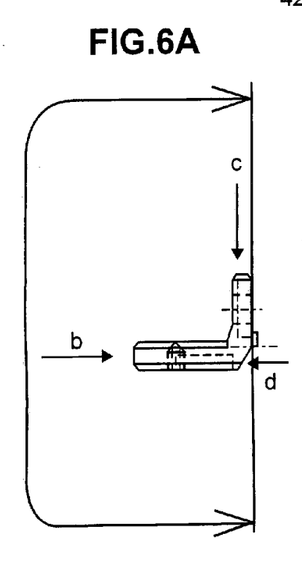
FIGS. 6(a) to 6(h) depict an example of a clipping mechanism.

In FIG. 6(a), the clipping mechanism 42 is provided with a clipping face 60 as first face that clips a medium together with the bed portion 40, and an abutting face 61 as second face that is abutted against a holder described later. The clipping face 60 and the abutting face 61 are in contact with each other at substantially right angle, and the cross sections of the clipping mechanism 42 are in L shape. The corner of the L shape is chamfered. The chamfered corner facilitates the operation of making the clipping mechanism 42 pivot.

Figure 6B:
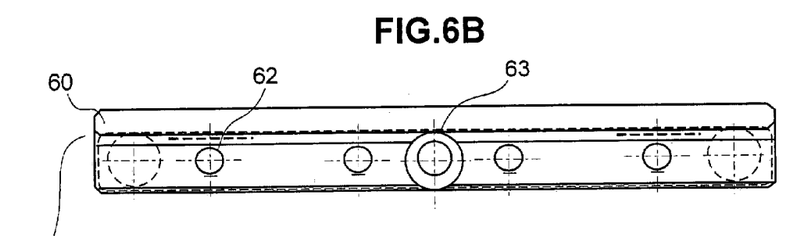

FIG. 6(b) illustrates the inside of the clipping face 60 viewed from above (from the direction of arrow b). The clipping face 60 has second fitting holes 62 and a window 63. The second fitting holes 62 are holes to be engaged with the positioning pins 12 on the installation base 2 that penetrate the bed portion 40. That is, in this embodiment, the height of the positioning pins is greater at least than the height of the bed portion 40. This constitution makes it possible to keep the positioning pins high, and the high positioning pins facilitates the positioning of media.

The window 63 is formed in a position corresponding to the scanning-in registration mark 14 put in the center of the upper part of the installation base 2. This arrangement is intended to prevent the scanning-in registration mark 14 put on the installation base 2 from being hidden away from the imaging portion 1 when the medium fixing structure 11 is installed on the installation base 2.

Figure 6C:
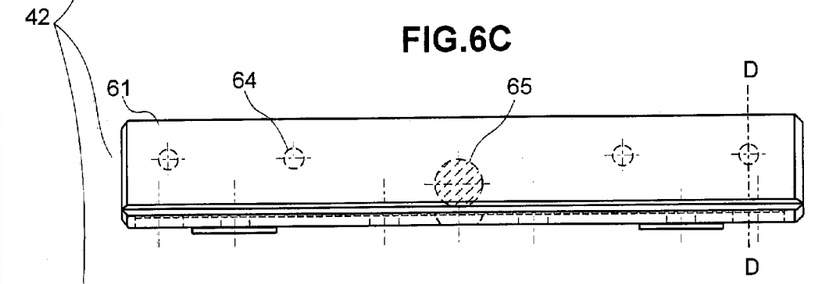

FIG. 6(c) illustrates the inside of the abutting face 61 viewed from the direction of arrow c. The abutting face is provided in the center thereof with a circular recess, into which a magnet 65 is bonded. This magnet 65 attracts the holder (70 in FIG. 7) described later each other, and is used to keep the clipping mechanism 42 retracted when the clipping mechanism is out of use. The abutting face 61 is provided with screw holes 64. These screw holes 64 are tapped and used to secure the above-mentioned hinges 44. In the area in the abutting face 61 where hinges are secured, recesses for embedding the hinges 44 are formed. When embedded in these recesses, the hinges 44 are not protruded from the abutting face 61. This is intended to allow the magnets 65 and the holder to attract each other. If the holder is not adopted, the magnet 65 may be omitted.

Figure 6D:
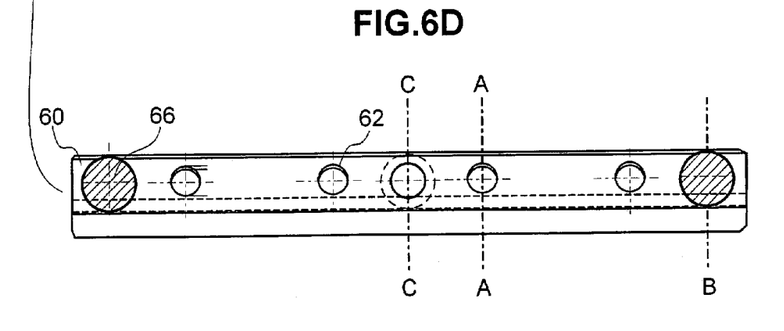
Figure 6E:
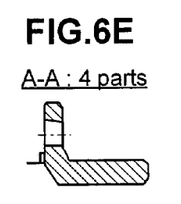

FIG. 6(d) illustrates the outside of the clipping face 60 viewed from the direction of "d." A recess is formed in proximity to both ends of the outside of the clipping face 60, and each recess is embedded with a magnet 66. In case magnetic force is used, an iron plate need be embedded in the installation base 2 in advanced (Refer to FIG. 4(b).) or, as this embodiment, an iron plate 18 as the bed portion need be installed on the installation base 2.

The clipping area 54 in the bed portion 42 against which the magnets 63 are abutted is made of a ferromagnetic material, and, when the clipping area 54 and the magnets 66 attract each other, a medium placed in-between is clipped. Though the magnets 66 are embedded in the clipping face 60 in this embodiment, the clipping area 54 may be embedded with magnets with the clipping face 60 made of a ferromagnetic material. Further, instead of only making the clipping area 54 of a ferromagnetic material, the entire bed portion 60 may be made of a ferromagnetic material. Possible clipping force sources include weights, springs, magnetic force, and the like.

Figure 6F:
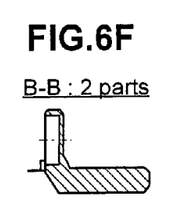
Figure 6G:
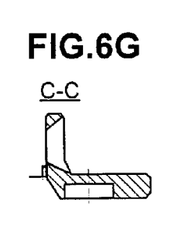
Figure 6H:
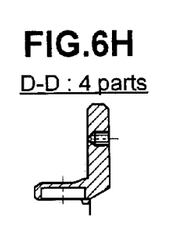

FIGS. 6(e) to 6(h) are cross sections at respective cutting-plane lines. FIGS. 6(f) to 6(h) illustrate the clipping mechanism, in cross section, with the magnets 63 and 66 removed.

The various views of FIG. 7 illustrate an example of-use of the clipping mechanism 42 using magnetic force. FIG. 7(a) illustrates the clipping mechanism 42 when it does not clip a medium. FIG. 7(b) illustrates the clipping mechanism when it releases clipping. FIG. 7(c) illustrates the clipping mechanism clipping a medium. FIG. 7(d) illustrates the clipping mechanism provided with a holder 70.

Figure 7A:
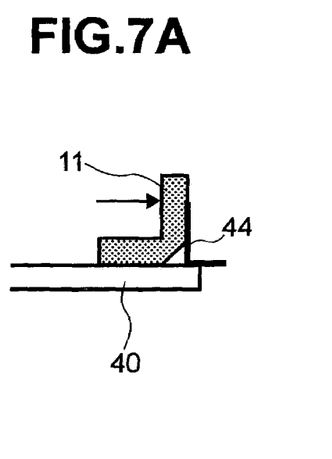
FIGS. 7(a) to 7(d) depict an example of the use of the clipping mechanism.
Figure 7B:
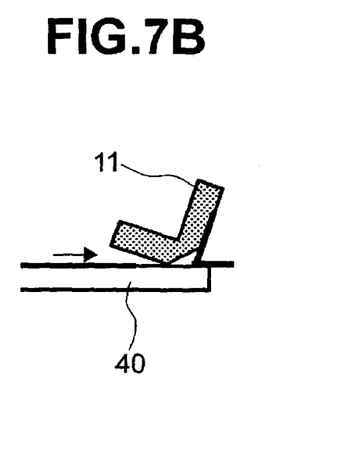
Figure 7C:
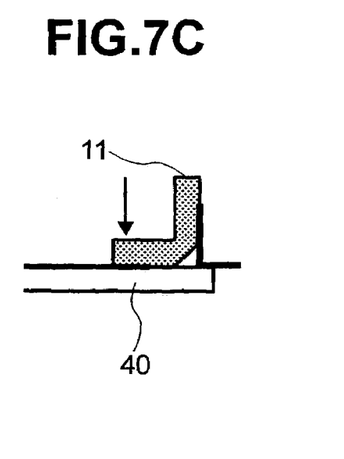

In FIG. 7(a), to clip a medium, the upper part of the clipping mechanism 42, the abutting face 61, is pressed to lift the front part thereof, instead of removing the clipping mechanism 42. In FIG. 7(b), a medium is inserted, and in FIG. 7(c), the front part is lowered.

Figure 7D:
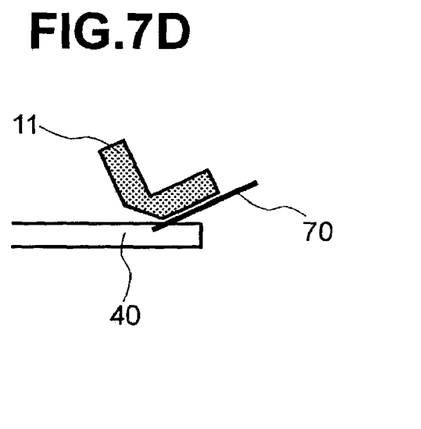

In this embodiment, the clipping mechanism is provided with a holder 70. The holder 70 is made of a ferromagnetic material. If a medium does not need to be fixed and thus the clipping mechanism 42 is not used, the clipping mechanism 42 is made attracted to the holder 70 installed on the installation base 2. Provision of the above-mentioned holder 70 makes it possible to keep the clipping mechanism 42 retracted so that the clipping mechanism does 42 not interfere with operation. Further, even if there are both media that need be clipped and media that need not, it is unnecessary to attach or detach the medium fixing structure 11 each time the media are changed, and this contributes to the enhancement of working efficiency.

In case the clipping mechanism 42 is retracted to the holder 70, it is the most appropriate option to use the magnetic force from magnets as the clipping force of the clipping mechanism 42. This is because: if weights or springs are selected for clipping force, another stress must be used for maintaining the unclipped state, and this leads to the complication of the mechanism. In this embodiment, the L-shaped clipping mechanism 42 is embedded with a magnet on both sides thereof (on the side of the installation base 2 and on the side of the holder 70).

Figure 8A:
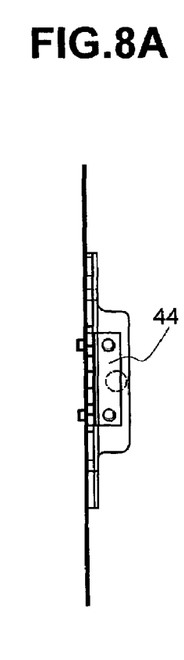
FIGS. 8(a) and 8(b) show another example of an general view of the medium fixing structure.
Figure 8B:
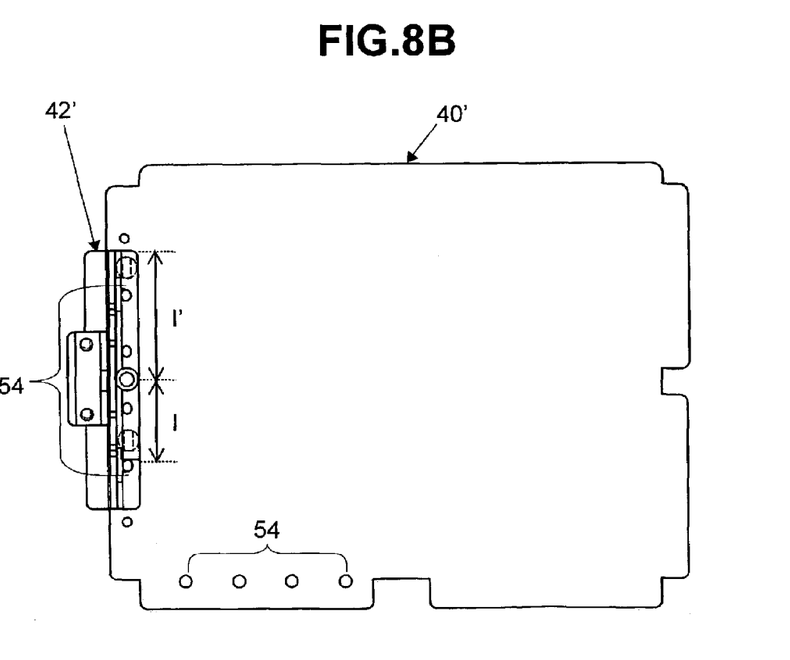
Figure 9:
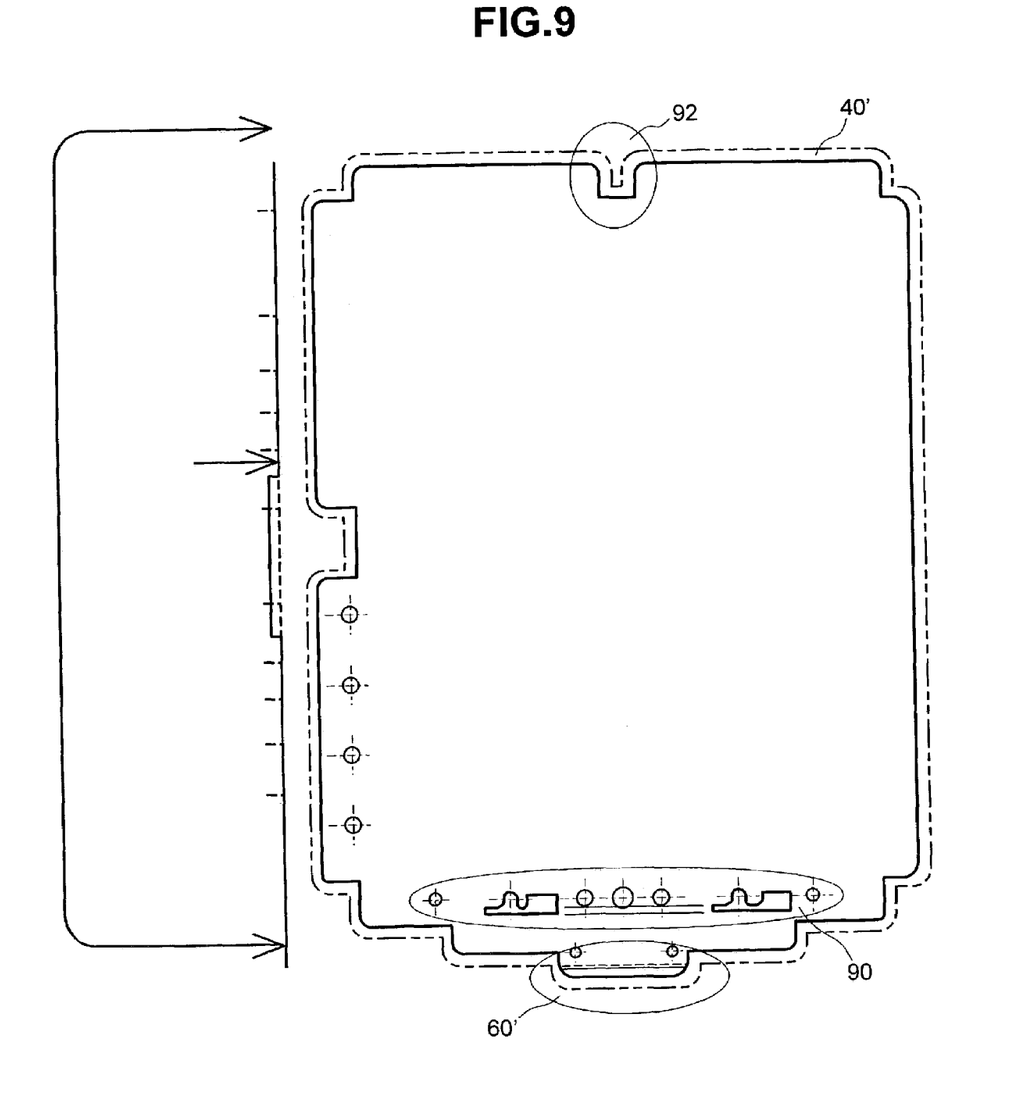
FIG. 9 is a drawing depicting another example of the bed portion.
Figures 10A, 10B, 10C, 10D, 10E, 10F, 10G, 10H, 10I:
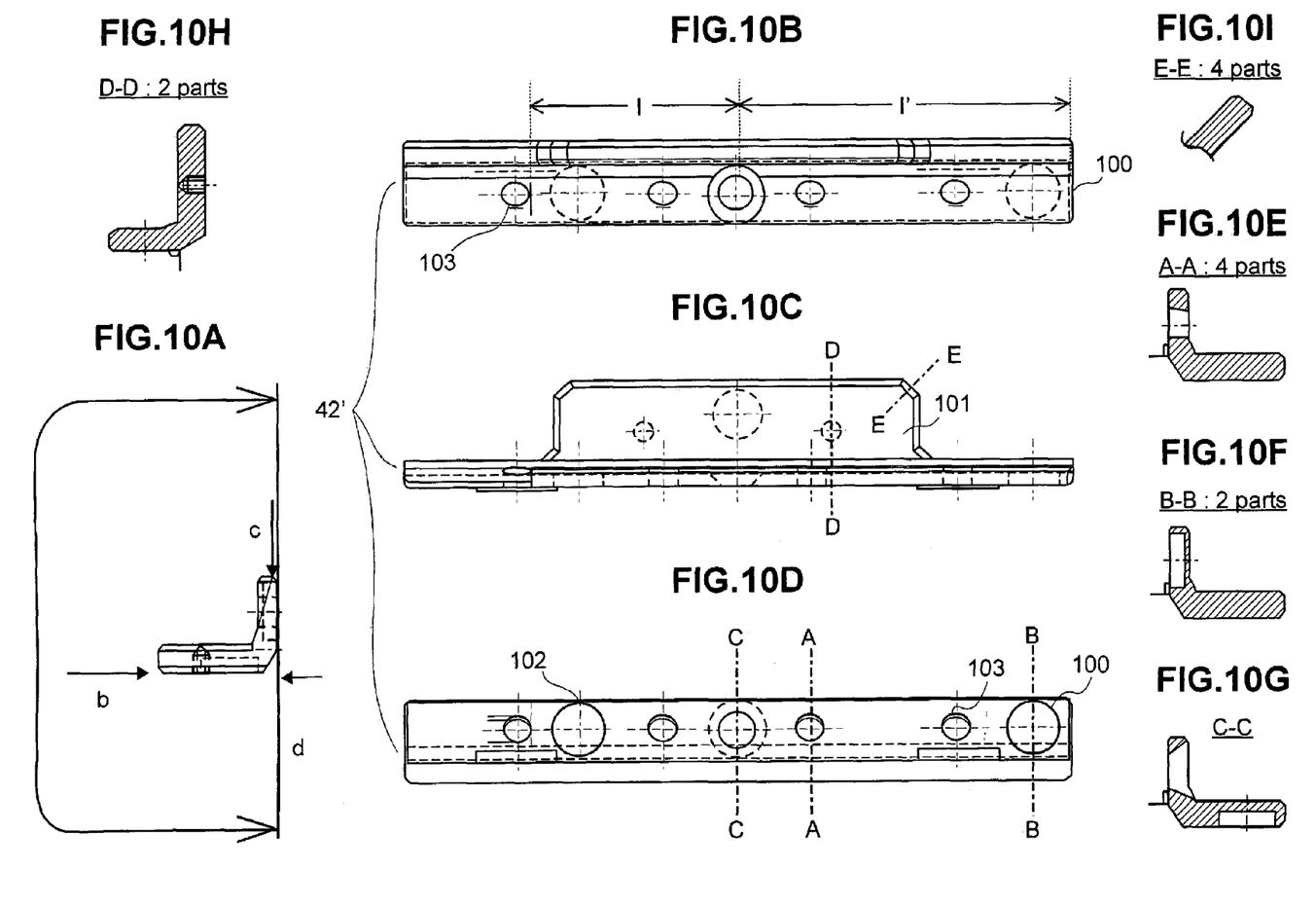
FIGS. 10(a) to 10(i) depict another example of the clipping mechanism.

Referring to FIGS. 8 to 10, a second example of the medium fixing structure 11 will be described. The medium fixing structure 11 illustrated in these drawings mainly includes a bed portion 40' and a clipping mechanism 42' as well. In this embodiment, the clipping face of the clipping mechanism 42' is small in width.

If a stand type image input device is equipped with the medium fixing structure 11, the shadow of the clipping mechanism 42 and the like may be cast on a medium depending on the lighting environment in which the device is installed, and the production of noise in images scanned in may result. To prevent this, measures are required to avoid the installation of the clipping mechanism 42 in proximity to the areas in media containing important information. This embodiment involves a shielding preventing mechanism, and is intended to apply to forms as medium. Forms have IDs for searching for definition data for the identification of forms, key information for systems, printed at the upper left thereof. On this account, consideration is given to the installation position of the clipping mechanism 42 and the length of the clipping mechanism 42 as shielding preventing mechanism to prevent the clipping mechanism 42 from being installed in proximity to the area where form IDs are printed.

Figure 11A:
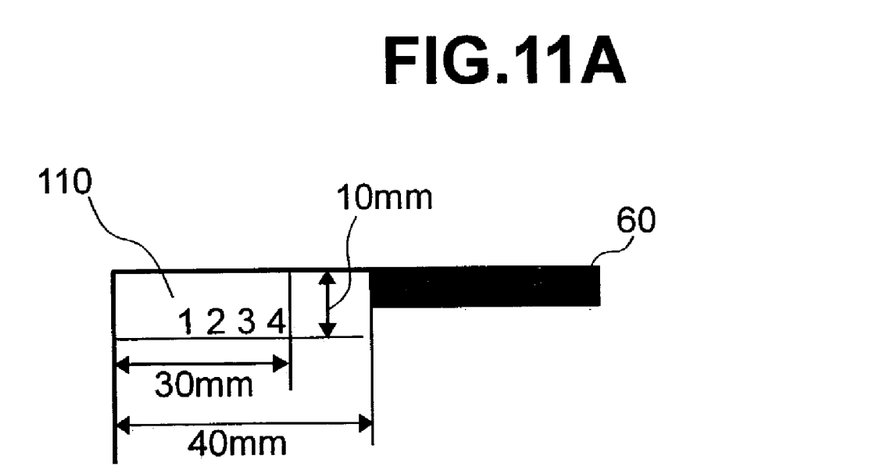
FIGS. 11(a) and 11(b) show explanatory drawing of the ID on an form.
Figure 11B:
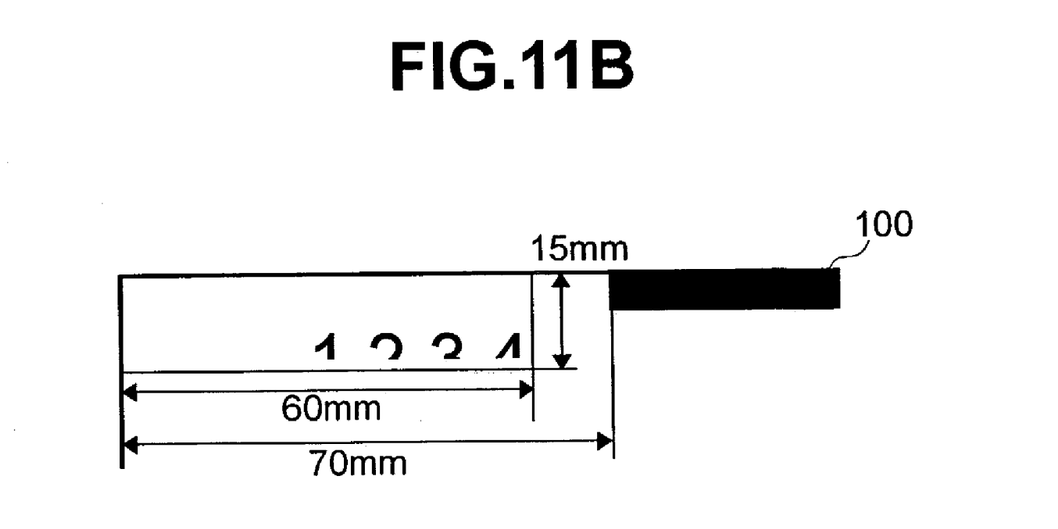

FIGS. 11(a) and 11(b) illustrate the positional relation between the clipping mechanism 42 and ID on a form. FIG. 11(a) illustrates an example of a form for which the medium fixing structure in FIG. 3 is intended. FIG. 11(b) illustrates an example of a form for which the medium fixing structure in FIG. 8 is intended.

In FIG. 11(a), ID 110 for identifying this form is printed at the upper left corner of the form. The inner corner, that is, the corner closest to the center of the form, of the ID 110 is positioned at distances of 30 mm from the left edge and 10 mm from the upper edge of the form.

In this embodiment, the medium fixing structure 11 is so arranged that the left edge of the clipping mechanism 42 is positioned at a distance of 40 mm from the leftmost fitting hole. Therefore, when a form is set so that the form is abutted against the positioning pins 13 protruded from the medium fixing structure 11, a 10 mm spacing is formed between the inner corner of the ID 110 thereof and the left edge of the clipping mechanism 42. Importance information can be clearly read by providing a shielding preventing mechanism as mentioned above.

The medium fixing structure in FIG. 3 also has a shielding preventing mechanism. Fundamentally, the length of the medium fixing structure is longer, it would be better for the ability to fix the medium. But in the medium fixing structure in FIG. 3, the length of the clipping mechanism 42 is shorter than the side of the bed portion 40, to which the clipping mechanism is attached. This structure gives the space to the corner where an important information on a medium comes.

In case of the example in FIG. 8, the inner corner of ID 110 is closer to the center of a form, and the length of the clipping mechanism 42' must be adjusted. Furthermore, the length of the clipping mechanism 42 is shorter than the side of the bed portion 40'. Consequently, in the medium fixing structure in FIG. 8, the length l of the end of the clipping face on the side of ID is shorter than the length 1' thereof on the opposite side.

FIG. 9 illustrates the bed portion 40' in this embodiment. A major difference between this bed portion and the bed portion 40 in FIG. 4 is the clipping mechanism mounting portion 90. This is because the abutting face 61 of the clipping mechanism 42' is small in width and the clipping mechanism 42' is secured on the bed portion 40' with one hinge unlike the case in FIG. 4. Another difference between this bed portion 40' and the bed portion 40 in FIG. 4 is that a cut 92 is also made at the lower side of the bed portion. This is because the medium fixing structure in FIG. 8 is intended for installation on the image input device in FIG. 2(a), whereas the medium fixing structure in FIG. 3 is intended for installation on the image input device in FIG. 2(b). In case of FIG. 2(b), the scanning-in registration mark 13 is not put at the substantially central part of the lower end of the installation base 2 but, in the image input device in FIG. 2(a), the scanning-in registration mark 13 is also put at the substantially central part of the lower end of the installation base 2.

The various views of FIG. 10 illustrate the clipping mechanism 42'. FIG. 10(a) is a side view of the clipping mechanism 42'. FIG. 10(b) illustrates the clipping mechanism 42' viewed from the direction of "b." FIG. 10(c) illustrates the clipping mechanism 42' viewed from the direction of "c." FIG. 10(d) illustrates the clipping mechanism 42' viewed from the direction of "d." FIGS. 10(e) to 10(i) are cross sections at respective cutting-plane lines. FIGS. 10(f), 10(g), and 10(h) illustrate the clipping mechanism with the magnets 63 and 66 removed.

A major difference between the clipping mechanism 42' in FIG. 10 and the clipping mechanism 42 is that the length l of one end of the clipping face 100 thereof is shorter than the length l' of the other end (a). Since the clipping mechanism 42' is secured on the bed portion 40' with one hinge 44, as described before, the abutting face 101 thereof is also shorter (c). Another difference is the position of magnets 102 embedded in the clipping face 100. In the clipping mechanism 40 in FIG. 6, the magnets are embedded between the fitting holes 62 formed in the clipping face 60 and the ends of the clipping face 60. Meanwhile, in the clipping mechanism 42' in FIG. 10, a magnet 102 is embedded between fitting holes 103 formed in the clipping face 100, that is, between the fitting hole close to the end of the face and the fitting hole close to the center of the face. This constitution is because the length of the one end of the clipping face 100 is shorter.

With a method wherein a medium is fixed using the above-mentioned medium fixing structure and the lower end of the medium is held down by hand, the recognition rate is enhanced as described below. If this method is applied to 45 forms in A-4 size folded in four (number of targets of recognition: 1260 fields, each containing seven to ten numeric characters), the result of recognition is as follows: The rate of correct field recognition is 13.5% when the medium fixing structure of the invention is not applied and 98.0% when the medium fixing structure is applied. Thus the invention is highly effective for systems that use a stand type image input device to recognize characters.

In the above-mentioned embodiments, the clipping mechanism 42, 42' may be installed at any optimum point, including the left end and the right end, as well as the upper end or the lower end, of the installation base 2, depending on service conditions. In the above-mentioned embodiments, an explanation is given to the medium fixing structure 11 formed as independent unit. However, in the image input device of the invention, the medium fixing structure 11 may be formed integrally with the installation base 2 or the strut 3. If media that must be fixed in advance are to be frequently processed, the clipping mechanism 11 may be installed directly on the installation base 2.

Figure 12A:
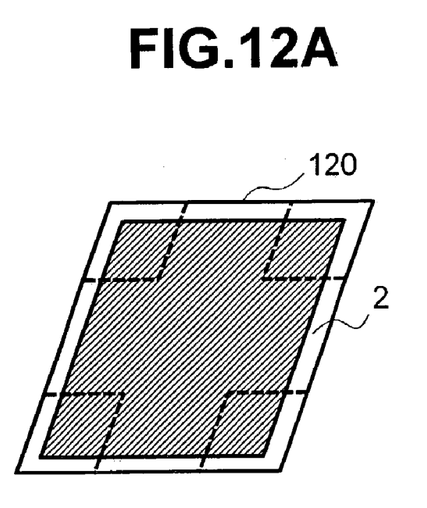
FIGS. 12(a) to 12(c) show an example of another medium fixing structure.

In the above-mentioned embodiments, a medium is fixed at one point and the clipping mechanism 42 is installed at the upper part of the bed portion 40. By adopting this constitution, the operation of changing media and repeatedly doing image input is facilitated. In this case and other similar cases, after the upper end of a medium is fixed by the clipping mechanism 42, 42', the medium may be straightened in the direction of the arrow by hand and the lower end of the medium is held down by hand before the image thereof is canned in. This procedure may be carried out in the same manner with such a part as a paperweight, instead of by hands. In this case, the lower end of a medium may be held down under the weight of a paperweight, or by magnetic force from a paperweight made of a magnet. Further, adhesion may be given to the installation base 2 so that a medium can be stuck thereto and thereby kept flat. In this case, media are repeatedly stuck and peeled off; therefore, a weakly adhesive material, such as silicon base material and urethane base material, is suitable for this purpose. If these materials get dirty, the adhesion thereof is revived by wiping the materials with a damp cloth. In FIG. 12(a), an adhesive area 120 is formed at the four corners of the installation base 2. The adhesive area 120 may be formed in optimum positions, including the entire surface, depending on service conditions.

Figure 12B:
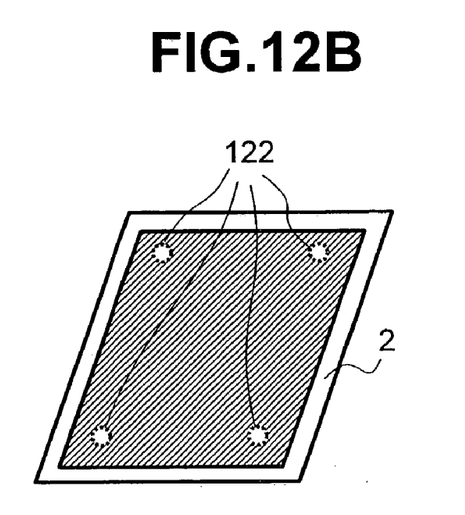

Further, as illustrated in FIG. 12(b), the installation base 2 may be provided therein with a sucking mechanism 122. In this case, a medium may be sucked through suction holes 122 and thereby kept flat. The suction holes 122 may be arranged in optimum positions according to service conditions.

Figure 12C:
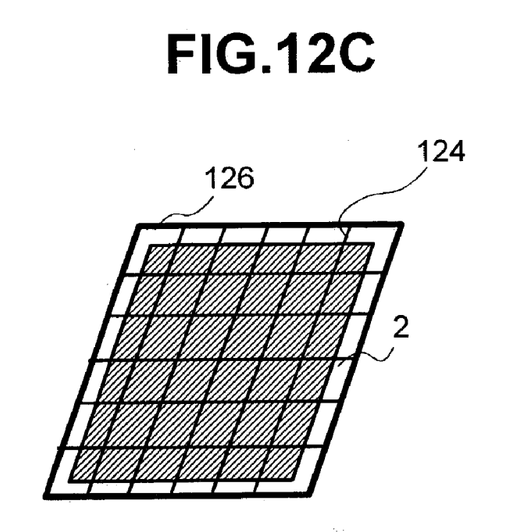

Further, as illustrated in FIG. 12(c), such a constitution that a medium is held down with filaments 124 finer than the resolution of the image input device may be adopted to hold the medium flat. In this case, the filaments 124 may be strung in a frame 126 having a certain level of weight, as in a tennis racket, and a medium may be held down with the strung face.

With the invention, a medium, if creased or curled, to be scanned in is straightened and scanned in on a stand type image input device. As a result, if character recognition or the like is carried out on an image scanned in, the rate of correct recognition is enhanced.

While the foregoing has described what are considered to be the best mode and/or other examples, it is understood that various modifications may be made therein and that the invention or inventions disclosed herein may be implemented in various forms and examples, and that they may be applied in numerous applications, only some of which have been described herein. It is intended by the following claims to claim any and all modifications and variations that fall within the true scope of the inventive concepts.

What is claimed is:

1. An image input device having a medium fixing structure comprising:
   an input portion which inputs the image of a medium;
   a stand mounted with said input portion;
   an installation base for supporting said stand; and
   a medium clipping mechanism installed on said installation base and which clips said medium, said medium clipping mechanism comprising:
   a clipping mechanism having a first flat plate placed on said installation base for holding down said medium and a second flat plate joining to said first flat plate, and
   a pivoting mechanism pivoting said clipping mechanism on the corner formed by said first flat plate and said second flat plate, wherein said first flat plate incorporates a first magnet, and part of said plate portion against which said first flat plate is abutted when said clipping mechanism clips a medium is made of a ferromagnetic material.

2. An image input device having a medium fixing structure comprising:
   an input portion which inputs the image of a medium;
   a stand mounted with said input portion;
   an installation base for supporting said stand;
   a medium clipping mechanism installed on said installation base and which clips said medium, said medium clipping mechanism comprising:
   a clipping mechanism having a first flat plate for holding down said medium and a second flat plate joining to said first flat plate, and
   a pivoting mechanism pivoting said clipping mechanism on the corner formed by
   said first flat plate and said second flat plate; and
   a holder holding said clipping mechanism while said clipping mechanism releases said medium, said holder has an abutting face which is abutted against a face of said second flat plate when the holder holds said clipping mechanism, said abutting face is made of a ferromagnetic material, and the second flat plate of said clipping mechanism incorporates a second magnet.

3. An image input device which inputs the image of a medium comprising:
   an input portion which inputs the image of a medium;
   a strut mounted with said input portion;
   a support base on which said medium is placed;
   a positioning mechanism arranged on said support base comprising:
   at least one protrusion formed on the upper face of said support base, and
   a medium fixing structure comprising:
   a plate on which said medium is installed, said plate having at least one first insertion hole through which said at least one protrusion is passed, and
   a clipping mechanism for clipping said medium, said clipping mechanism has at least one second insertion hole through which said at least one protrusion is passed and comprises:
   a first flat plate for holding down a medium,
   a second flat plate conjunct with said first flat plate, a turning mechanism for turning said clipping mechanism on a conjunction corner of said first flat plate and said second flat plate, a first magnet incorporated in said first flat plate, and said first flat plate on which the medium is installed is made of ferromagnetic material at least in part against which said first flat plate is abutted when said clipping mechanism clips a medium, and a medium fixing structure mounted on said support base over said positioning mechanism.

4. An image input device which inputs the image of a medium comprising:

an input portion which inputs the image of a medium;

a strut mounted with said input portion;

a support base on which said medium is placed;

a positioning mechanism arranged on said support base, said positioning mechanism comprises:

at least one protrusion formed on the upper face of said support base, and a medium fixing structure comprising:

a plate on which said medium is installed, said plate has at least one first insertion hole through which said at least one protrusion is passed, and a clipping mechanism for clipping said medium, said clipping mechanism has a flat plate and at least one second insertion hole through which said at least one protrusion is passed;

a medium fixing structure mounted on said support base over said positioning mechanism; and a holder for holding said clipping mechanism while said clipping mechanism is released, said holder has a face abutted against said flat plate; the abutting face of the holder is made of a ferromagnetic material, and said flat plate of said clipping mechanism incorporates a second magnet.

5. A medium fixing structure for mounting on an image input device, said image input device having a first positioning mechanism for positioning a medium, said first positioning mechanism comprises at least one protrusion on said image input device, said medium fixing structure comprising:

a clip for clipping said medium;

a bed plate on which said medium is placed; and a second positioning mechanism for positioning said medium, said second positioning mechanism disposed in an area in said bed plate facing toward said first positioning mechanism of said image input device, said second positioning mechanism comprises at least one first hole which is formed on the facing area in said bed plate for engagement with said protrusion, height of said bed plate is greater than the height of said protrusion, said first plate incorporates at least one first magnet, the area where said first hole is formed comprises a ferromagnetic material.

6. A medium fixing structure for mounting on an image input device, said image input device having a first positioning mechanism for positioning a medium, said medium fixing structure comprising:

a bed plate on which said medium is placed;

a clip for clipping a medium, said clip comprises a second plate abutted against said holding mechanism, said second plate incorporates at least one second magnet;

a second positioning mechanism for positioning said medium, said second positioning mechanism disposed in an area in said bed plate facing toward said first positioning mechanism of said image input device; and a holding mechanism comprising a ferromagnetic material for holding said clip when the clip releases a medium.

* * * * *

UNITED STATES PATENT AND TRADEMARK OFFICE
CERTIFICATE OF CORRECTION

PATENT NO.         : 7,253,931 B2                                    Page 1 of 1
APPLICATION NO. : 10/345345
DATED              : August 7, 2007
INVENTOR(S)        : Tetsuya Hori et al.

It is certified that error appears in the above-identified patent and that said Letters Patent is hereby corrected as shown below:

On the Title page, item "(73) Assignee", change "Hitachi, Ltd., Tokyo (JP)" to
-- Hitachi-Omron Terminal Solutions, Corp, Tokyo (JP) --.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,253,931 B2 Page 1 of 1
APPLICATION NO. : 10/345345
DATED : August 7, 2007
INVENTOR(S) : Tetsuya Hori et al.

It is certified that error appears in the above-identified patent and that said Letters Patent is hereby corrected as shown below:

On the Title page,

Item "(73) Assignee", change "Hitachi, Ltd., Tokyo (JP)" to -- Hitachi-Omron Terminal Solutions, Corp, Tokyo (JP) --.

Signed and Sealed this

Twenty-sixth Day of August, 2008

JON W. DUDAS
*Director of the United States Patent and Trademark Office*